(12) United States Patent
Greff et al.

(10) Patent No.: US 10,085,108 B2
(45) Date of Patent: Sep. 25, 2018

(54) METHOD FOR VISUALIZING THE DIRECTIONAL SOUND ACTIVITY OF A MULTICHANNEL AUDIO SIGNAL

(71) Applicant: A-Volute, Roubaix (FR)

(72) Inventors: Raphael Nicolas Greff, Lille (FR); Hong Cong Tuyen Pham, Croix (FR)

(73) Assignee: A-VOLUTE, Roubaix (FR)

( * ) Notice: Subject to any disclaimer, the term of this patent is extended or adjusted under 35 U.S.C. 154(b) by 0 days.

(21) Appl. No.: 15/708,579

(22) Filed: Sep. 19, 2017

(65) Prior Publication Data
US 2018/0084367 A1 Mar. 22, 2018

(30) Foreign Application Priority Data
Sep. 19, 2016 (EP) .................... 16306190

(51) Int. Cl.
*H04S 7/00* (2006.01)
*G10L 19/02* (2013.01)
*G10L 19/008* (2013.01)

(52) U.S. Cl.
CPC .............. *H04S 7/40* (2013.01); *G10L 19/008* (2013.01); *G10L 19/02* (2013.01); *H04S 2400/01* (2013.01)

(58) Field of Classification Search
None
See application file for complete search history.

(56) References Cited

U.S. PATENT DOCUMENTS 8,295,493 B2 10/2012 Faller
8,374,365 B2 2/2013 Goodwin et al.
(Continued)

FOREIGN PATENT DOCUMENTS

WO 2004/077884 A1 9/2004
WO 2006/006809 A1 1/2006
WO 2008/113428 A1 9/2008

OTHER PUBLICATIONS

Vilkamo et al. "Directional Audio Coding: Virtual Microphone-Based Synthesis and Subjective Evaluation", Journal of the Audio Engineering Society, vol. 57, No. 9, Sep. 2009, pp. 709-724.
(Continued)

*Primary Examiner* — Curtis Kuntz
*Assistant Examiner* — Kenny Truong
(74) *Attorney, Agent, or Firm* — Womble Bond Dickinson (US) LLP

(57) ABSTRACT

A method for visualizing a directional sound activity of a multichannel audio signal, wherein the multichannel audio signal comprises time-dependent input audio signals, comprising determining a directional sound activity vector from virtual sound sources determined from an active directional vector and a reactive directional vector determined from time-frequency representations of different input audio signals for each one of a plurality of time-frequency tiles; determining a contribution of each one of said directional sound activity vectors within sub-divisions of space on the basis of directivity information related to each sub-divisions of space and directional sound activity level within said sub-division of space by summing said contributions; displaying a visualization of the directional sound activity of the multichannel audio signal by a graphical representation of directional sound activity level within said sub-division of space.

17 Claims, 7 Drawing Sheets

(56) References Cited

U.S. PATENT DOCUMENTS

| | | | |
|---|---|---|---|
| 8,379,868 | B2 | 2/2013 | Goodwin et al. |
| 8,705,750 | B2 | 4/2014 | Berge |
| 8,908,873 | B2 | 12/2014 | Herre et al. |
| 9,232,337 | B2 | 1/2016 | Greff et al. |
| 2006/0171547 | A1 | 8/2006 | Lokki et al. |
| 2007/0211170 | A1 | 9/2007 | Ramaswamy et al. |
| 2007/0269063 | A1* | 11/2007 | Goodwin .............. G10L 19/008 381/310 |
| 2008/0232616 | A1 | 9/2008 | Pulkki et al. |
| 2008/0232617 | A1 | 9/2008 | Goodwin et al. |
| 2009/0182564 | A1 | 7/2009 | Beack et al. |
| 2009/0296954 | A1 | 12/2009 | Hooley et al. |
| 2011/0050842 | A1 | 3/2011 | Saleh et al. |
| 2011/0283865 | A1 | 11/2011 | Collins |
| 2013/0022206 | A1 | 1/2013 | Thiergart et al. |
| 2014/0177844 | A1* | 6/2014 | Greff ........................ H04S 7/40 381/17 |
| 2015/0249899 | A1 | 9/2015 | Kuech et al. |
| 2015/0332682 | A1 | 11/2015 | Kim et al. |
| 2015/0332690 | A1 | 11/2015 | Kim et al. |

OTHER PUBLICATIONS

Vickers Earl, "Frequency-Domain Two-To Three-Channel Upmix for Center Channel Derivation and Speech Enhancement", 127th Convention of the Audio Engineering Society, Convention Paper 7917, Oct. 9-12, 2009, 24 pages.

Pulkki Ville, "Spatial Sound Reproduction with Directional Audio Coding", Journal of the Audio Engineering Society, vol. 55, No. 6, Jun. 2007, pp. 503-516.

Merimaa et al., "Spatial Impulse Response Rendering I: Analysis and Synthesis", Journal of the Audio Engineering Society, vol. 53, No. 12, Dec. 2005, pp. 1115-1127.

Merimaa et al. "Correlation-Based Ambiance Extraction from Stereo Recordings", 123th Convention of the Audio Engineering Society, Convention Paper 7282, Oct. 5-8, 2007, 15 pages.

International Telecommunication Union, "Multichannel Stereophonic Sound System with and without Accompanying Picture", Recommendation ITU-R BS.775-2, BS Series, Broadcasting service (sound), Jul. 2006, 13 pages.

Herre et al., "Spatial Audio Coding: Next-Generation Efficient and Compatible Coding of Multichannel Audio", 117th Convention of the Audio Engineering Society, Oct. 28-31, 2004, 13 pages.

Goodwin et al., "Primary-Ambient Signal Decomposition and Vector-Based Localization for Spatial Audio Coding and Enhancement", IEEE International Conference on Acoustics, Speech and Signal Processing, ICASSP, 2007, pp. 1-9-1-12.

Goodwin et al., "Binaural 3D Audio Rendering Based on Spatial Audio Scene Coding", 123th Convention of the Audio Engineering Society, Convention Paper 7277, Oct. 5-8, 2007, 12 pages.

Goodwin et al., "Analysis and Synthesis for Universal Spatial Audio Coding", 121st Convention of the Audio Engineering Society, Convention Paper 6874, Oct. 5-8, 2006, 11 pages.

Goodwin et al., "A Frequency-Domain Framework for Spatial Audio Coding Based on Universal Spatial Cues", Convention Paper 6751, 120th Convention of the Audio Engineering Society, May 20-23, 2006, 12 pages.

European Search Report and Written Opinion received for EP Patent Application No. 16306190.6, dated Feb. 24, 2017, 5 pages.

Collins et al., "Visualized Sound Effect Icons for Improved Multimedia Accessibility: A Pilot Study", Entertainment Computing, vol. 3, 2012, pp. 11-17.

Breebaart et al., "MPEG Spatial Audio Coding / MPEG Surround: Overview and Current Status", 119th Convention of the Audio Engineering Society, Convention Paper 6599, Oct. 7-10, 2005, 17 pages.

Berge et al., "High Angular Resolution Plane Wave Expansion", Proc. of the 2nd International Symposium on Ambisonics and Spherical Acoustics, May 6-7, 2010, Paris, France, 6 pages.

Berge et al., "A New Method for B-Format to Binaural Transcoding", AES 40th International Conference, Tokyo, Japan, Oct. 8-10, 2010, 10 pages.

* cited by examiner

METHOD FOR VISUALIZING THE DIRECTIONAL SOUND ACTIVITY OF A MULTICHANNEL AUDIO SIGNAL

CROSS-REFERENCE TO RELATED APPLICATIONS

This application claims priority under 35 U.S.C 119(a) to European patent application Ser. No. 16306190.6 filed on Sep. 19, 2016, all of which is hereby expressly incorporated by reference into the present application.

BACKGROUND OF THE INVENTION

The invention relates to a method and apparatus for visualizing the directional sound activity of a multichannel audio signal.

Audio is an important medium for conveying any kind of information, especially sound direction information. Indeed, the human auditory system is more effective than the visual system for surveillance tasks. Thanks to the development of multichannel audio format, spatialization has become a common feature in all domains of audio: movies, video games, virtual reality, music, etc. For instance, when playing a First Person Shooting (FPS) game using a multichannel sound system (5.1 or 7.1 surround sound), it is possible to localize enemies thanks to their sounds.

Typically, such sounds are mixed onto multiple audio channels, wherein each channel is fed to a dedicated loudspeaker. Distribution of a sound to the different channels is adapted to the configuration of the dedicated playback system (positions of the loudspeakers), so as to reproduce the intended directionality of said sound.

Multichannel audio streams thus require to be played back over suitable loudspeaker layouts. For instance, each of the channels of a five-channel formatted audio signal is associated with its corresponding loudspeaker within a five-loudspeaker array. FIG. 1 shows an example of a five-channel loudspeaker layout recommended by the International Telecommunication Union (ITU), with a left loudspeaker L, right loudspeaker R, center loudspeaker C, surround left loudspeaker LS and surround right loudspeaker RS, arranged around a reference listening point O which is the recommended listener's position O. With this reference listening point O as a center, the relative angular distances between the central directions of the loudspeakers are indicated.

A multichannel audio signal is thus encoded according to an audio file format dedicated to a prescribed spatial configuration where loudspeakers are arranged at prescribed positions to a reference listening point. Indeed, each time-dependent input audio signal of the multichannel audio signal is associated with a channel, each channel corresponding to a prescribed position of a loudspeaker.

If multichannel audio is played back over an appropriate sound system, i.e. with the required number of loudspeakers and correct angular distances between them, a normal hearing listener is able to detect the location of the sound sources that compose the multichannel audio mix. However, should the sound system exhibit inappropriate features, such as too few loudspeakers, or an inaccurate angular distance thereof, the directional information of the audio content may not be delivered properly to the listener. This is especially the case when sound is played back over headphones.

As a consequence, there is in this case a loss of information since the multichannel audio signal conveys sound direction information through the respective sound levels of the channels, but such information cannot be delivered to the user. Accordingly, there is a need for conveying to the user the sound direction information encoded in the multichannel audio signal.

Some methods have been provided for conveying directional information related to sound through the visual modality. However, these methods were often a mere juxtaposition of volume meters, each dedicated to a particular loudspeaker, and thus unable to render precisely the simultaneous predominant direction of the sounds that compose the multichannel audio mix except in the case of one unique virtual sound source whose direction coincides with a loudspeaker direction. Other methods intended to more precisely display sound locations are so complicated that they reveal themselves inadequate since sound directions cannot be readily derived by a user.

For example, U.S. patent application US 2009/0182564 describes a method wherein sound power level of each channel is displayed, or alternatively wherein position and power level of elementary sound components are displayed.

U.S. Pat. No. 9,232,337 B2 describes a method for visualizing a directional sound activity of a multichannel audio signal that displays a visualization of a directional sound activity of the multichannel audio signal through a graphical representation of directional sound activity level within a sub-division of space. For a channel and for a frequency sub-band, a sound activity vector is formed by associating the sound activity level corresponding to the frequency-domain signal of said channel and said sub-band to the unit vector corresponding to the spatial information associated with said channel. In an embodiment of this patent, the energy vector sum representative for the perceived directional energy is directly calculated using Gerzon's energy vectors, as a mere summation of the sound activity vectors related to the channels for said frequency sub-band. This directional sound activity vector represents the predominant sound direction that would be perceived by a listener according to the recommended loudspeaker layout for sounds within that particular frequency sub-band.

However, if this method visually renders the main sound direction, it may not always achieve optimal results for a user. Indeed, this method does not exploit diffuse sounds, but focuses on identifying and displaying the main sound directions, regardless of the nature of the sound (directivity or diffuseness). As a result, when the sound is very diffuse, it may not be able to correctly extract a useful main sound direction from the noisy environment.

SUMMARY OF THE INVENTION

The method and system according to the invention is intended to provide a simple and clear visualization of sound activity in any direction.

In accordance with a first aspect of the present invention, this object is achieved by a method for visualizing a directional sound activity of a multichannel audio signal, wherein the multichannel audio signal comprises time-dependent input audio signals, each time-dependent input audio signal being associated with an input channel, spatial information with respect to a reference listening point being associated with each one of said channel, the method comprising:
  receiving the time-dependent input audio signals;
  performing a time-frequency conversion of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, the time-frequency tiles being the same for the different input channels;

for each time-frequency tile, determining positions of at least two virtual sound sources with respect to the reference listening point and frequency signal values for each virtual sound source from an active directional vector and a reactive directional vector determined from time-frequency representations of different input audio signals for said time-frequency tile, wherein the active directional vector is determined from a real part of a complex intensity vector and the reactive directional vector is determined from an imaginary part of the complex intensity vector;

for each time-frequency tile, determining a directional sound activity vector from the virtual sound sources, determining a contribution of each one of said directional sound activity vectors within sub-divisions of space on the basis of directivity information related to each sub-divisions of space;

for each sub-division of space, determining directional sound activity level within said sub-division of space by summing said contributions within said sub-division of space;

displaying a visualization of the directional sound activity of the multichannel audio signal by a graphical representation of directional sound activity level within said sub-division of space.

Other preferred, although non-limitative, aspects of the pixel circuit of the Invention are as follows, isolated or in a technically feasible combination:

the active directional vector of a time-frequency tile is representative of the sound energy flow at the reference listening point for the time frame and a frequency sub-band of said time-frequency tile, and wherein the reactive directional vector is representative of acoustic perturbations at the reference listening point with respect to the sound energy flow;

each input channel is associated with a sound direction defined between the reference listening point and the prescribed position of the speaker associated with said input channel, and a sound velocity vector is determined as a function of a sum of each sound direction weighted by the time-frequency representation corresponding to the input channel associated with said sound direction, said sound velocity vector being used to determine the active directional vector and the reactive directional vector;

a sound pressure value defined by a sum of the time-frequency representations of the different input channels is used to determine the active directional vector and the reactive directional vector;

the complex intensity vector results from a complex product between a conjugate of a sound pressure value for a time-frequency tile and a sound velocity vector for said time-frequency tile;

for determining time-frequency signal values of each one of the virtual sound sources, virtual microphone signals are determined, each virtual microphone signal being associated with a virtual sound source and corresponding to the signal that would acquire a virtual microphone arranged at the reference listening point and oriented in the direction toward the position of said virtual sound source;

the time-frequency signal value of a virtual sound source is determined by suppressing, in the virtual microphone signal associated with said virtual sound source, the interferences from other virtual sound sources;

the virtual sound sources are arranged on a circle centered on the reference listening point and a virtual microphone signal corresponds to the signal that would acquire a virtual cardioid microphone having an cardioid directivity pattern in the shape of a cardioid tangential to the circle centered on the reference listening point;

there are three virtual sound sources for each time-frequency tile, each virtual sound source having a position with respect to the reference listening point, wherein:
  a position of a first virtual sound source defines with the reference listening point a direction which is collinear to the direction of the active directional vector from the reference listening point,
  a position of a second virtual sound source defines with the reference listening point a direction which is collinear to the direction of the reactive directional vector with a first orientation,
  a position of a third virtual sound source defines with the reference listening point a direction which is collinear to the direction of the reactive directional vector with a second orientation opposite to the first orientation;

there are two virtual sound sources for each time-frequency tile, each virtual sound source having a position with respect to the reference listening point, and wherein:
  a position of a first virtual sound source defines with the reference listening point a direction resulting from the sum of the active directional vector and the reactive directional vector weighted by a positive factor, and
  a position of a second virtual sound source defines with the reference listening point a direction resulting from the sum of the active directional vector and the reactive directional vector weighted by a negative factor;

information used for determining the contribution of a directional sound activity vector within a sub-division of space is an angular distance between a direction associated with said sub-division of space and the direction of said directional sound activity vector;

the contribution of a directional sound activity vector within a sub-division of space is determined by weighting a norm of said directional sound activity vector on the basis of an angular distance between a direction associated with said sub-division of space and the direction of said directional sound activity vector;

norms of the directional sound activity vectors are further weighted based on their respective frequency sub-bands;

at least two set of directional sound activity vectors determined from the same input audio channels are weighted based on their respective frequency sub-bands in accordance with two different set of weighting parameters, and the two resulting directional sound activities are displayed on the graphical representation;

the visualization of the directional sound activity of the multichannel audio signal comprises representations of said sub-division of space, each provided with a representation of the directional sound activity associated with said sub-division.

The invention also relates to a non-transitory tangible computer-readable medium having computer executable instructions embodied thereon that, when executed by a computer, perform the method according to the invention.

The invention also relates to an apparatus for visualizing directional sound activity of a multichannel audio signal, comprising:

an input for receiving time-dependent input audio signals for a plurality of input channels, a processor and a memory for:

performing a time-frequency conversion of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, the time-frequency tiles being the same for the different input channels, for each time-frequency tile, determining an active directional vector and a reactive directional vector from time-frequency representations of different input channels for said time-frequency tile, wherein the active directional vector is determined from a real part of a complex intensity vector and the reactive directional vector is determined from an imaginary part of the complex intensity vector, for each time-frequency tile, determining positions of virtual sound sources with respect to the reference listening point in a virtual spatial configuration from the active directional vector and the reactive directional vector, and determining time-frequency signal values for each virtual sound sources, for each time-frequency tile, determining a directional sound activity vector from the virtual sound sources, determining a contribution of each one of said directional sound activity vectors within sub-divisions of space on the basis of directivity information related to each sub-divisions of space, for each sub-division of space, determining directional sound activity data within said sub-division of space by summing said contributions within said sub-division of space, a visualizing unit for displaying a visualization of the directional sound activity of the multichannel audio signal.

BRIEF DESCRIPTION OF THE DRAWINGS

Other aspects, objects and advantages of the present invention will become better apparent upon reading the following detailed description of preferred embodiments thereof, given as a non-limiting example, and made with reference to the appended drawings wherein.

DETAILED DESCRIPTION OF THE INVENTION

Figure 1:
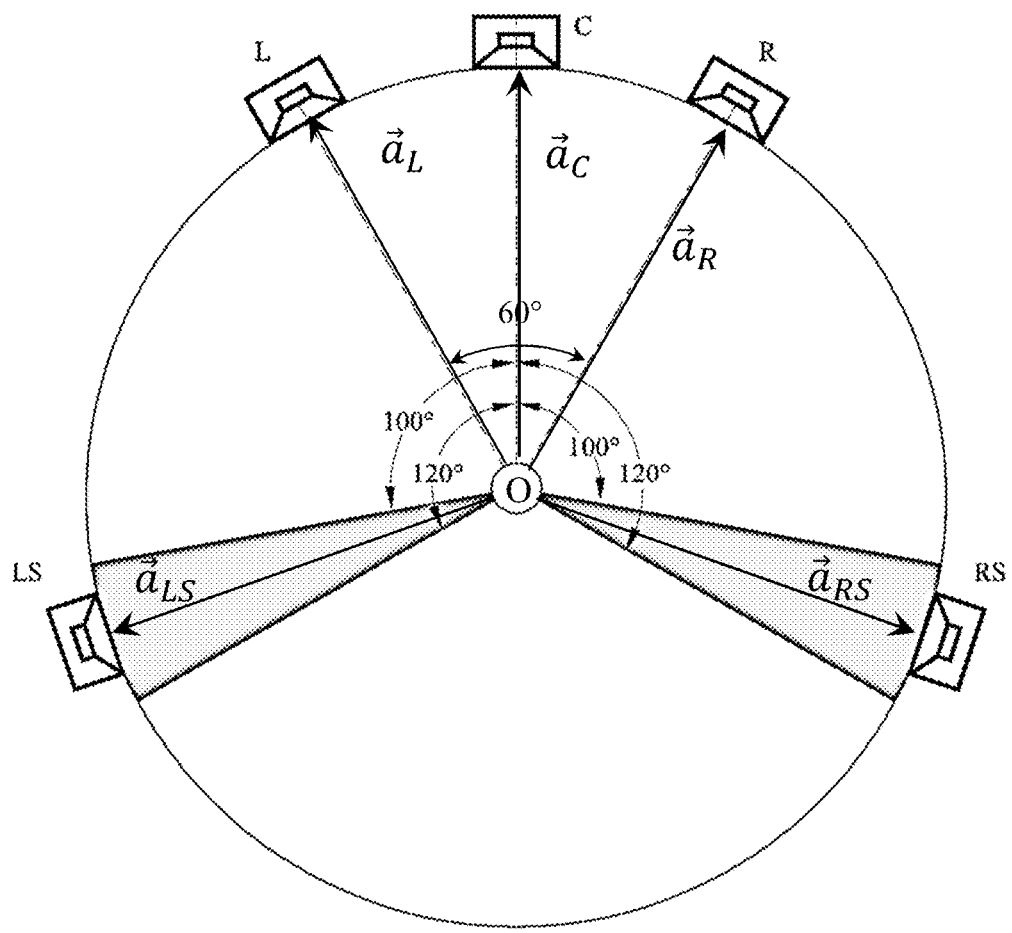
FIG. 1, already discussed, shows an example of prescribed positions of loudspeakers with respect to a reference listening point in a prescribed spatial configuration for multichannel audio system.
Figure 2:
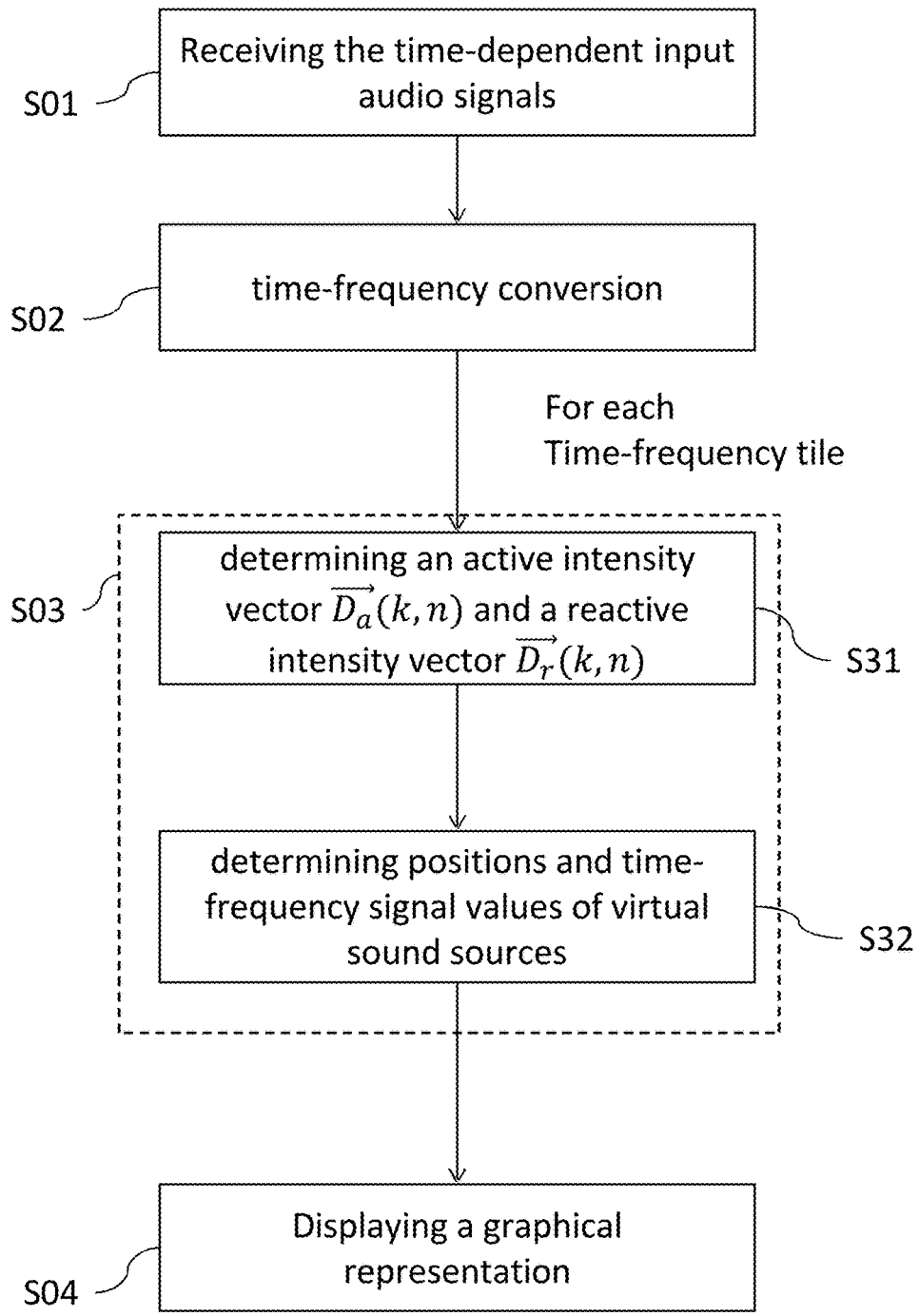
FIG. 2 is a diagram showing steps of the method.
Figure 3:
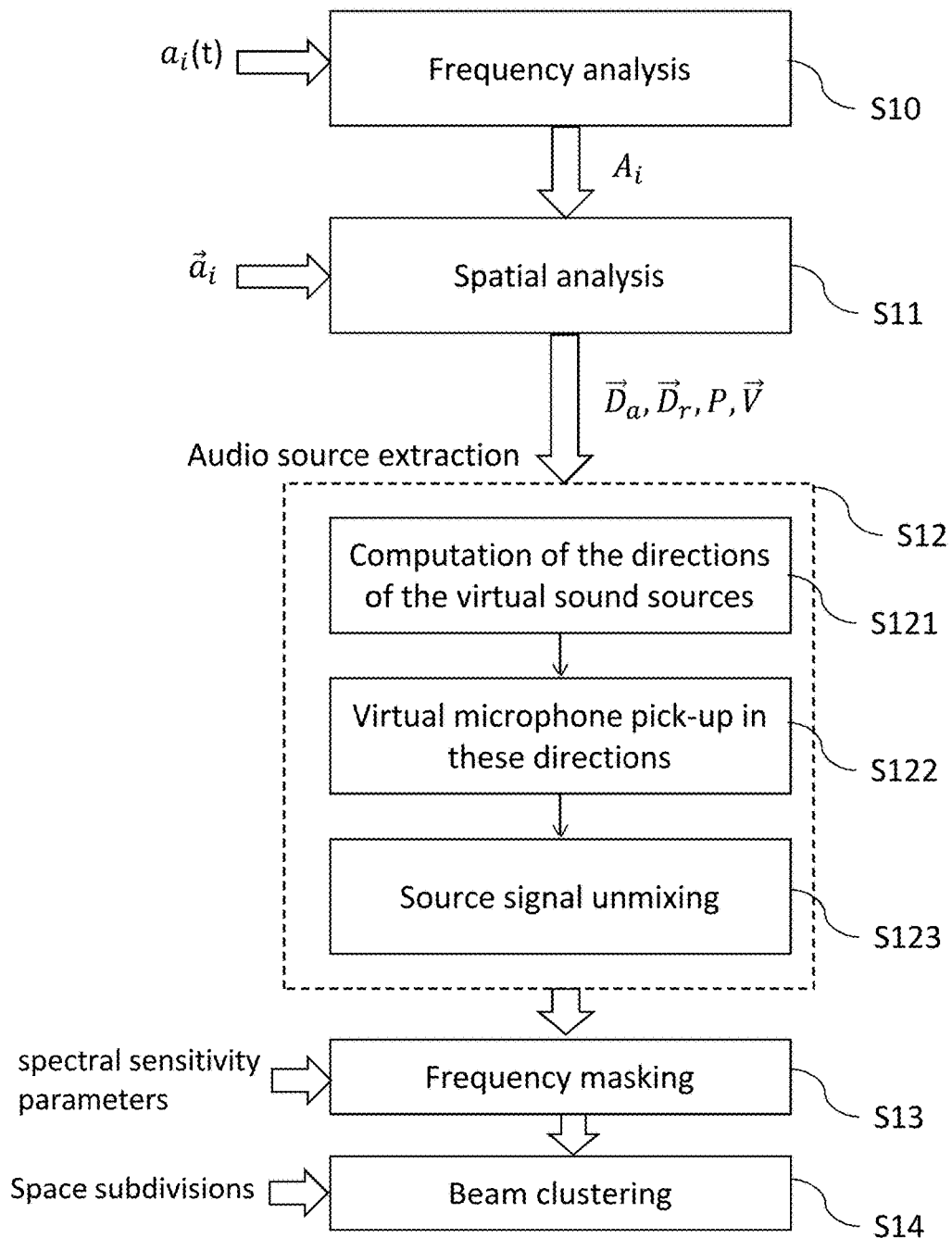
FIG. 3 is a diagram showing stages of the signal processing in the method.

The operation of a directional sound activity analyzing unit, which may be part of a device comprising a processor, typically a computer, further provided with means for acquiring audio signals and means for displaying a visualization of sound activity data, for example visual display unit such as a screen or a computer monitor. The directional sound activity analyzing unit comprises means for executing the described method, such as a processor or any computing device, and a memory for buffering signals or storing various process parameters.

The directional sound activity analyzing unit receives an input signal constituted by a multichannel audio signal. This multichannel audio signal comprises K time-dependent input audio signals associated with K input audio channels, each time-dependent input audio signal being associated with an input channel. Each channel is associated with spatial information. Spatial information describes the location of the associated loudspeaker relative to the listener's location, called the reference listening point. For example, spatial information can be coordinates or angles and distances used to locate a loudspeaker with respect to the reference listening point, generally a listener's recommended location. Typically, three values per audio channel are provided to describe this localization. Spatial parameters constituting said spatial information may then be represented by a K×3 matrix.

An input receives the multichannel audio signal comprising time-dependent input audio signals for a plurality of input channels (step S01). Each time-dependent input audio signal is associated with an input channel. Each input channel corresponds to a prescribed position of an electroacoustic transducer with respect to a reference listening point in a prescribed spatial configuration. For example, in the prescribed spatial configuration shown by FIG. 1, there are five input channels, one for each loudspeaker LS, L, C, R, RS.

Under the plane-wave model assumption, the position of a sound source (e.g. the location of each loudspeaker) may be defined solely by the direction of the sound source with respect to the reference listening point. A unitary vector is then sufficient to locate a sound source. Accordingly, each of the prescribed positions defines a unitary vector $\vec{a}_i$ representing the sound direction and originating from the reference listening point and pointing in the direction of each loudspeaker. As a result, each input channel i is associated with a sound direction $\vec{a}_i$ defined between the reference listening point and the prescribed position of the loudspeaker associated with said input channel i. For example, in the prescribed spatial configuration shown in FIG. 1, the location of the loudspeaker C is defined by the sound vector $\vec{a}_C$ that originates from the reference listening point O and towards the location of the loudspeaker C on the unitary circle. This sound vector $\vec{a}_C$ extends in the front of the listening point. In a similar way, the location of the loudspeaker L is defined by the sound vector $\vec{a}_L$ that originates from the reference listening point O and towards the location of the loudspeaker L on the unitary circle. In this example, the directions of the sound vector $\vec{a}_C$ and of the sound vector $\vec{a}_L$ are at an angle of 30°.

The directional sound activity analyzing unit receives these input audio channels, and then determines directional sound activity levels to be displayed for visualizing the directional sound activity of a multichannel audio signal. The directional sound activity analyzing unit is configured to perform the steps of the above-described method. The method is performed on an extracted part of the input signal corresponding to a temporal window. For example, a 50 ms duration analysis window can be chosen for analyzing the directional sound activity within said window.

Frequency Analysis

First, a frequency band analysis aims at estimating the sound activity level for a predetermined number of frequency sub-bands for each channel of the windowed multichannel audio signal.

The received time-dependent input audio signals $a_i(t)$ may be analog, but they preferably are digital signals. There are as many input audio signals $a_i(t)$ as input channels i. During the frequency analysis (step S10), the time-dependent input audio signals $a_i(t)$ are converted into the frequency domain by performing a time-frequency conversion (step S02). Typically, the time-frequency conversion uses a Fourier-related transform such as a Short-time Fourier transform (STFT), which is used to determine the sinusoidal frequency and phase content of local sections of a signal as it changes over time.

More precisely, each time-dependent input audio signal $a_i(t)$ is converted into a plurality of time-frequency representations $A_i(k, n)$ for the input channel i associated with said time-dependent input audio signal. Each time-frequency representation $A_i(k, n)$ corresponds to a time-frequency tile defined by a time frame and a frequency sub-band. The conversion is made on a frame-by-frame basis.

Preferably, the frame length is comprised between 5 ms and 80 ms. Preferably, the width of the frequency sub-band is comprised between 10 Hz and 200 Hz. Preferably the inter-frame spacing is comprised between $1/16^{th}$ and one half of the frame length. For instance, for a sampling rate of 48 kHz and an FFT-based STFT processing framework, the frame length may be of 1024 samples with a related frequency sub-band width (or bin width) of 46.875 Hz and an inter-frame spacing of 512 samples. The time-frequency tiles are the same for the different input channels i.

The frequency sub-bands are subdivisions of the frequency band of the audio signal, which can be divided into sub-bands of equal widths or preferably into sub-bands whose widths are dependent on human hearing sensitivity to the frequencies of said sub-bands.

In the following, k is used as a frequency index of a frequency sub-band and n is a frame index, so that the time-frequency representation $A_i(k, n)$ refers to a complex number associated with the $k^{th}$ frequency sub-band and the $n^{th}$ frame of the signal of the input channel i. The time-frequency representations $A_i(k, n)$ and the sound directions $\vec{a}_I$ are then used in a time-frequency processing (step S03) wherein the data of a time-frequency tile are processed.

Spatial Analysis

Spatial analysis (step S11) is performed from time-frequency representations $A_i(k, n)$ and the sound directions $\vec{a}_I$ of a time-frequency tile. For each time-frequency tile, an active directional vector $\vec{D}_a(k, n)$ and a reactive directional vector $\vec{D}_r(k, n)$ are determined (step S31) from time-frequency representations $A_i(k, n)$ of different input channels for said time-frequency tile.

The active directional vector $\vec{D}_a(k, n)$ of a time-frequency tile is proportional to the active acoustical intensity vector which is representative of the sound energy flow at the reference listening point for the time frame and the frequency sub-band of said time-frequency tile. More specifically, the active directional vector $\vec{D}_a(k, n)$ corresponds to the active acoustical intensity vector, normalized by the sum of the acoustic energies $E_P(k, n)$ and $E_K(k, n)$ at the reference listening point O, with an added minus sign in order to have it directed from the reference listening point O towards the unitary circle. It is possible to use a different normalization or to omit the minus sign, in which case the vectors would be pointing towards the reference listening point O.

The reactive directional vector $\vec{D}_r(k, n)$ is proportional to the reactive acoustical intensity vector which is representative of acoustic perturbations at the reference listening point with respect to the sound energy flow for the same time-frequency tile. More specifically, the reactive directional vector $\vec{D}_r(k, n)$ corresponds to the reactive acoustical intensity vector, normalized by the sum of the acoustic energies $E_P(k, n)$ and $E_K(k, n)$ at the reference listening point O. A minus sign is also added but could be omitted. As for the active directional vector, it is possible to use a different normalization.

From a perceptual point of view, if the active directional vector $\vec{D}_a(k, n)$ can be related to the primary directional sound field, the reactive directional vector $\vec{D}_r(k, n)$ is related to the ambient diffuse sound field. Moreover, the directional information of the reactive directional vector $\vec{D}_r(k, n)$ enables the handling of the spatial characteristics of this ambient sound field, and thus it can be used to describe not only totally diffused ambient sound fields but also partially diffused ones.

This new approach is by nature more robust as it takes benefits of the reliability of the active directional vector $\vec{D}_a(k, n)$ which is a true acoustical spatial cue (compared to the Gerzon vectors which are empiric perceptual cues), but also exploits the diffuseness of sound through the reactive directional vector $\vec{D}_r(k, n)$.

Figure 4:
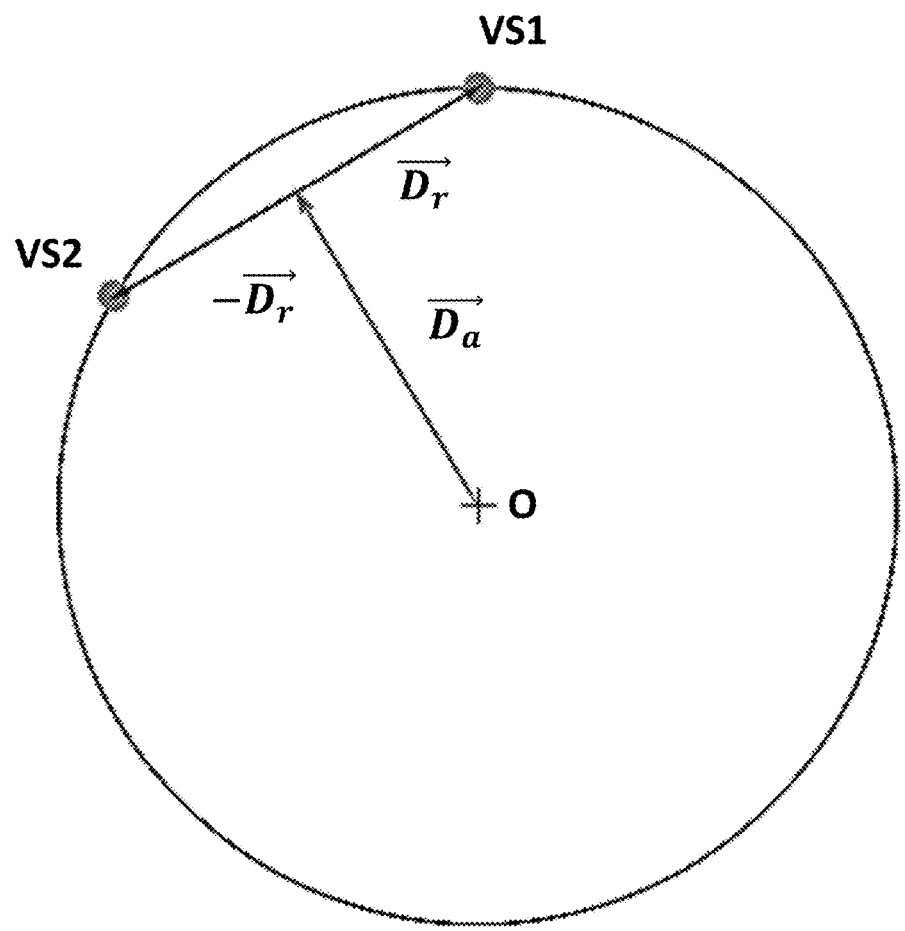
FIG. 4 shows schematically an example of a relationship between the active directional vector and the reactive directional vector with the locations of virtual sound sources.

It has been found that the combination of the active directional vector $\vec{D}_a(k, n)$ and the reactive directional vector $\vec{D}_r(k, n)$ may be used to identify the locations of sound sources, as depicted with the example on FIG. 4. In this FIG. 4, sound distribution is represented by two virtual sound sources VS1 and VS2 arranged on a unitary circle centered on the reference listening point O. The active directional vector $\vec{D}_a(k, n)$ originates from the reference listening point O and is directed along the main acoustical flow. In this example, the two uncorrelated sound sources VS1, VS2 are of equal energy (for that time-frequency tile). As a result, the perceived acoustical energy flow at the reference listening point O comes from the middle of the two sound sources VS1, VS2, and therefore the active directional vector $\vec{D}_a(k, n)$ extends between the two sound sources VS1, VS2. The reactive directional vector $\vec{D}_r(k, n)$ is here perpendicular to the active directional vector $\vec{D}_a(k, n)$, and the location of a sound source VS1, VS2 corresponds to the sum of the active directional vector $\vec{D}_a(k, n)$ and of the reactive directional vector $\vec{D}_r(k, n)$ or of the opposite of the reactive directional vector $\vec{D}_r(k, n)$.

However, most of the time, the sound sources VS1, VS2 are not totally uncorrelated. It has been found that whatever the exact locations of the two sound sources VS1, VS2, the reactive intensity is maximal when the source signals are totally uncorrelated. Conversely, the reactive intensity is minimal when the source signals are totally correlated. In a similar way, where the sound source signals are totally uncorrelated, the reactive intensity is maximal when the source directions are spatially negatively correlated (i.e. opposite) with respect to the reference listening point O. Conversely, the reactive intensity is minimal when the source directions are spatially correlated (i.e. in the same direction) with respect to the reference listening point O.

For determining the active directional vector $\vec{D}_a(k, n)$ and the reactive directional vector $\vec{D}_r(k, n)$, the prescribed positions of the loudspeakers with respect to the reference listening point O in a prescribed spatial configuration are used. As indicated above, each input channel i is associated with a sound direction $\vec{a}_i$ defined between the reference listening point O and the prescribed position of the loudspeaker associated with said input channel i.

A sound pressure value P(k, n) for a time-frequency tile defined by a sum of the time-frequency representations $A_i(k, n)$ of the different input channels of the same for said time-frequency tile is determined:

$$P(k, n) = \sum_i A_i(k, n)$$

A sound velocity vector $\vec{V}(k, n)$ for the time-frequency tile is determined, said sound velocity vector $\vec{V}(k, n)$ being proportional to a sum of each sound direction $\vec{a}_i$ weighted by the time-frequency representation $A_i(k, n)$ corresponding to the input channel i associated with said sound direction $\vec{a}_i$:

$$\vec{V}(k, n) = -\frac{1}{\rho c} \sum_i A_i(k, n) \vec{a}_i = \begin{pmatrix} V_x(k, n) \\ V_y(k, n) \\ V_z(k, n) \end{pmatrix}$$

where $$\begin{cases} V_x(k, n) = -\frac{1}{\rho c} \sum_i A_i(k, n) \vec{a}_i \cdot \vec{e}_x \\ V_y(k, n) = -\frac{1}{\rho c} \sum_i A_i(k, n) \vec{a}_i \cdot \vec{e}_y \\ V_z(k, n) = -\frac{1}{\rho c} \sum_i A_i(k, n) \vec{a}_i \cdot \vec{e}_z \end{cases}$$

with $\vec{e}_x$, $\vec{e}_y$ and $\vec{e}_z$ the unitary vectors of a coordinate system used as a reference frame for the virtual spatial configuration, $\rho$ the density of air and c the speed of sound. For example, the speed of sound in dry air at 20° C. is 343.2 meters per second, which may be approximated to 340 m·s$^{-1}$. At sea level and at 15° C., air density is approximately 1.225 kg/m$^3$, which may be approximated to 1.2 kg/m$^3$. Other values may be used.

A complex intensity vector $\vec{I}(k, n)$ resulting from a complex product between a conjugate of the sound pressure value P(k, n) for a time-frequency tile and the sound velocity vector $\vec{V}(k, n)$ for said time-frequency tile is determined:

$$\vec{I}(k,n) = P(k,n)^* \vec{V}(k,n)$$

and is used to determine the active directional vector $\vec{D}_a(k, n)$ and the reactive directional vector $\vec{D}_r(k, n)$ of said time-frequency tile. More precisely, the active directional vector $\vec{D}_a(k, n)$ is determined from the real part of the complex product $\vec{I}(k, n)$ and the reactive directional vector $\vec{D}_r(k, n)$ is determined from the imaginary part of the complex product $\vec{I}(k, n)$.

The active directional vector $\vec{D}_a(k, n)$ and the reactive directional vector $\vec{D}_r(k, n)$ may be calculated as follows:

$$\begin{cases} \vec{D}_a(k, n) = -\Re\left(\frac{\vec{I}(k, n)}{c(E_P(k, n) + E_K(k, n))}\right) \\ \vec{D}_r(k, n) = -\Im\left(\frac{\vec{I}(k, n)}{c(E_P(k, n) + E_K(k, n))}\right) \end{cases}$$

where $$\begin{cases} E_K(k, n) = \frac{\rho}{2} \vec{V}(k, n)^H \vec{V}(k, n) = \frac{\rho}{2}(|V_x(k, n)|^2 + |V_y(k, n)|^2 + |V_z(k, n)|^2) \\ E_P(k, n) = \frac{1}{2\rho c^2} P(k, n) * P(k, n) = \frac{1}{2\rho c^2}|P(k, n)|^2 \end{cases}$$

It shall be noted that the active directional vector $\vec{D}_a(k, n)$ and the reactive directional vector $\vec{D}_r(k, n)$ are here normalized by the energies $E_K(k, n)$ and $E_p(k,n)$, but could be calculated otherwise. It shall be noted that that a minus sign is added to the expressions of the active directional vector $\vec{D}_a(k, n)$ and reactive directional vector $\vec{D}_r(k, n)$ in order to have them directed from the reference listening point O towards the unitary circle. It would be possible to omit the minus sign, in which case the vectors would be pointing towards the reference listening point O.

Once the active directional vector $\vec{D}_a(k, n)$, the reactive directional vector $\vec{D}_r(k, n)$, the sound pressure value P(k, n) and the sound velocity vector $\vec{V}(k, n)$ (or the equivalents thereof) have been determined, it is possible to perform the audio source extraction (step S12) for determining positions and time-frequency signal values of virtual sound sources (step S32).

Audio Source Extraction

The method requires determining the attributes (position and time-frequency signal values) of virtual sound sources that will be used thereafter to determine the signals of the electroacoustic transducers of the actual spatial configuration.

For each time-frequency tile, the active directional vector $\vec{D}_a(k, n)$ and the reactive directional vector $\vec{D}_r(k, n)$ are used to determine the positions of the virtual sound sources with respect to the reference listening point in a virtual spatial configuration (step S32).

The determined positions of the virtual sound sources, the active directional vector $\vec{D}_a(k, n)$, the reactive directional vector $\vec{D}_r(k, n)$, the sound pressure value $P(k, n)$ and the sound velocity vector $\vec{V}(k, n)$ are used to determine virtual first-order directional microphone signals (step S122) corresponding to the sounds that would be acquired by virtual microphones arranged at the reference listening point O and directed towards each virtual sound sources. There are as many virtual microphones as virtual sound sources.

A virtual microphone signal is a function of the sum of the sound pressure value $P(k, n)$, and of the scalar product between the sound velocity vector $\vec{V}(k, n)$ and a unitary vector in the direction of a sound source, possibly weighted by the density of air ρ and the speed of sound c. For example, a virtual cardioid microphone signal $M_j(k, n)$ associated with a virtual sound source arranged in the direction defined by $\vec{s}_j(k, n)$ can be calculated as follows:

$$M_j(k, n) = \frac{P(k, n) + \rho c \vec{V}(k, n) \cdot \vec{s}_j(k, n)}{2}$$

A virtual microphone signal highlights the sound of the corresponding virtual sound source perceived at the reference listening point O, but also contains interferences from the other virtual sound sources. However, defining the virtual microphone signals for every virtual sound source allows identifying the virtual sound source signal of each virtual sound source.

It shall be noted that spatial manipulation may be performed by modifying the positions of the virtual sound sources. This approach is much safer than modifying the input channel data side defining the prescribed positions, because the original primary/ambient energy ratio is kept.

The details of the source extraction process however change depending on the number of virtual sound sources. The audio source extraction process estimates the locations and frequency signal values of virtual sound sources that generate the same sound field characteristics as the sound field defined by the time-dependent input audio signals in the prescribed configuration. Source-related sound field models need to be defined, as the audio source extraction process may be highly different from one model to another. Two reliable models with the analysis based on the exploitation of both the active and reactive components of the acoustical intensity are described below: a model with two virtual sound sources and a model with three virtual sound sources.

The "two-source" model handles the diffuseness (and thus makes use of the reactive component) as an indicator of the perceptual width of a sound source or local diffuseness. Two sound sources are sufficient to simulate a wider sound source, their spatial and signal correlation defining the perceived wideness of this composite sound source. The "three-source" model handles the diffuseness (and thus makes use of the reactive component) as an indicator of the ambience level within the sound scene or global diffuseness. Two uncorrelated sound sources of opposite directions are suitable to simulate this ambient component, in addition to a first virtual sound source corresponding to the primary component. It is explained below how to proceed with two virtual sound sources or three virtual sound sources.

Source Extraction: Two Virtual Sound Sources

Figure 5:
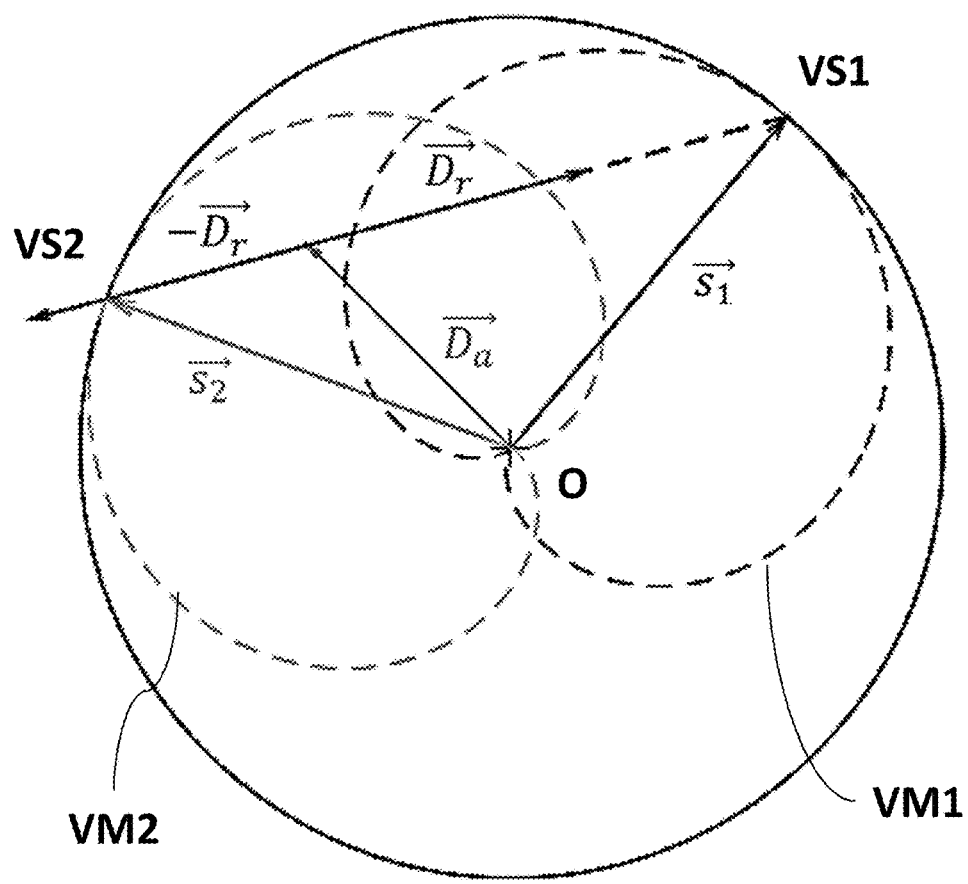
FIG. 5 shows schematically an example of a virtual spatial configuration with two virtual sound sources, and the active directional vector and the reactive directional vector, and the cardioids of the two corresponding virtual microphones.

In a spatial configuration of a unitary circle centered on the reference listening point O, the virtual sound sources are positioned on the unitary circle. A position of a virtual sound source is therefore at the intersection of the unitary circle with a directional line extending from the reference listening point. The position of each virtual sound source can be defined by a unitary source direction vector $\vec{s}_j(k, n)$ originating from the reference listening point. This is shown in FIG. 5.

As indicated above, the first step of the source extraction consists in determining the positions of the two virtual sound sources (step S121). As shown in FIG. 5, each unitary source direction vector $\vec{s}_j(k, n)$ is defined through the active directional vector $\vec{D}_a(k, n)$ and reactive directional vector $\vec{D}_r(k, n)$. More precisely, a virtual sound source is located at the intersection of the unitary circle and a line collinear with the reactive directional vector $\vec{D}_r(k, n)$ and passing through the tip of the active directional vector $\vec{D}_a(k, n)$ originating from the reference listening point.

If the analyzed sound field is generated by two uncorrelated sound sources (not necessary of equal energy), this technique enables to retrieve the exact location of those two sound sources. If the two sound sources used to generate the sound field tend to be in-phase (respectively opposite-phase), their exact locations cannot be retrieved anymore. The technique over-estimates (respectively under-estimates) the spatial correlation between the two sound source directions. However, this relationship between signal correlation and spatial correlation is perceptively coherent.

Determining the locations of the two virtual sound sources VS1, VS2 is equivalent to solving a geometry problem of the intersection of a line with a circle (or a sphere for three-dimensional sound field). Solving this problem is equivalent to solving a second order equation, which solutions are $$\begin{cases} \vec{s}_1(k, n) = \vec{D}_a(k, n) - \frac{\beta(k, n) + \sqrt{\Delta(k, n)}}{2\alpha(k, n)} \vec{D}_r(k, n) \\ \vec{s}_2(k, n) = \vec{D}_a(k, n) - \frac{\beta(k, n) - \sqrt{\Delta(k, n)}}{2\alpha(k, n)} \vec{D}_r(k, n) \end{cases}$$

with $$\begin{cases} \alpha(k, n) = \|\vec{D}_r(k, n)\|^2 \\ \beta(k, n) = 2\vec{D}_a(k, n) \cdot \vec{D}_r(k, n) \\ \Delta(k, n) = \beta(k, n)^2 - 4\alpha(k, n)(\|\vec{D}_a(k, n)\|^2 - 1) \end{cases}$$

It shall be noted that there are:

a position of a first virtual sound source VS1 defines, with the reference listening point O, a direction resulting from the sum of the active directional vector $\vec{D}_a(k, n)$ and the reactive directional vector $\vec{D}_r(k, n)$ weighted by a positive factor, and a position of a second virtual sound source VS2 defines, with the reference listening point O, a direction resulting from the sum of the active directional vector $\vec{D}_a(k, n)$ and the reactive directional vector $\vec{D}_r(k, n)$ weighted by a negative factor.

We thus have a source direction vector $\vec{s}_1(k, n)$ of a first virtual sound source VS1, and a source direction vector $\vec{s}_2(k, n)$ of a second virtual sound source VS2. As depicted in FIG. 5, these source direction vectors $\vec{s}_1(k, n)$, $\vec{s}_2(k, n)$ localize the virtual sound sources VS1, VS2 on the unitary circle centered on the reference listening point O.

As explained above, after the computation of the directions of the two virtual sound sources VS1, VS2, it is possible, by combining the sound pressure value P(k, n) and the sound velocity vector $\vec{V}(k, n)$ to the source direction vectors $\vec{s}_1(k, n)$, $\vec{s}_2(k, n)$, to create two virtual directional microphones. As depicted in FIG. 5, the two virtual directional microphones may have a cardioid directivity patterns VM1, VM2 in the directions of the source direction vectors $\vec{s}_1(k, n)$, $\vec{s}_2(k, n)$. The virtual microphone pick-up in these two directions may then be estimated by virtual microphone signals $M_1(k, n)$, $M_2(k, n)$ defined as follows:

$$\begin{cases} M_1(k, n) = \dfrac{P(k, n) + \rho c \vec{V}(k, n) \cdot \vec{s}_1(k, n)}{2} \\ M_2(k, n) = \dfrac{P(k, n) + \rho c \vec{V}(k, n) \cdot \vec{s}_2(k, n)}{2} \end{cases}$$

As explained above, each virtual microphone signal highlights the sound signal of the corresponding virtual sound source VS1, VS2 perceived at the reference listening point O, but also contains interferences from the other virtual sound source:

$$\begin{cases} M_1(k, n) = S_1(k, n) + \mu(k, n) S_2(k, n) \\ M_2(k, n) = S_2(k, n) + \mu(k, n) S_1(k, n) \end{cases}$$

with $$\mu(k, n) = \dfrac{1 + \vec{s}_1(k, n) \cdot \vec{s}_2(k, n)}{2}$$

where $S_1(k, n)$ is the time-frequency signal value of the first virtual sound source VS1 and $S_2(k, n)$ is the time-frequency signal value of the second virtual sound source VS2. A last processing step permits to extract the time-frequency signal values $S_1(k, n)$, $S_2(k, n)$ of each virtual sound source by unmixing the source signals from the virtual microphone signals (step S123):

$$\begin{cases} S_1(k, n) = \dfrac{S_{sum}(k, n) + S_{diff}(k, n)}{2} \\ S_2(k, n) = \dfrac{S_{sum}(k, n) - S_{diff}(k, n)}{2} \end{cases}$$

with $$\begin{cases} S_{sum}(k, n) = \dfrac{M_1(k, n) + M_2(k, n)}{1 + \mu(k, n)} \\ S_{diff}(k, n) = \dfrac{M_1(k, n) - M_2(k, n)}{1 - \mu(k, n)} \end{cases}$$

The positions of the two virtual sound sources VS1, VS2, defined by the source direction vectors $\vec{s}_1(k, n)$ and $\vec{s}_2(k, n)$, and their respective time-frequency signal values $S_1(k, n)$ and $S_2(k, n)$ have been determined.

It shall be noted that the two virtual sound sources VS1, VS2 are equivalent, in the sense that they contain both primary component (through the active directional vector $\vec{D}_a(k, n)$) and ambient components (through the reactive directional vector $\vec{D}_r(k, n)$). An ambience extraction processing may be performed for implementing additional refinement.

Audio Source Extraction: Three Virtual Sound Sources

Figure 6:
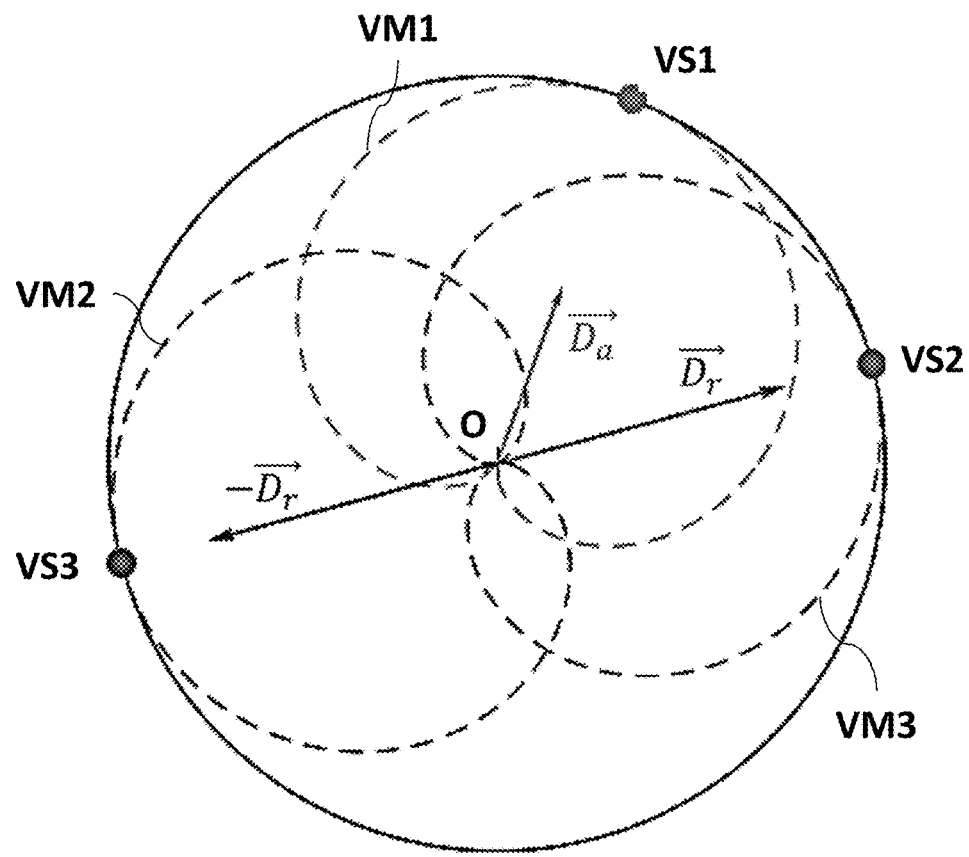
FIG. 6 shows schematically an example of a virtual spatial configuration with three virtual sound sources and the cardioids of the three corresponding virtual microphones, as well as the active directional vector and the reactive directional vector.

As explained before, the first step of the audio source extraction consists in determining the positions of the three virtual sound sources, through unitary source direction vectors $\vec{s}_j(k, n)$ defined by the active directional vector $\vec{D}_a(k, n)$ and reactive directional vector $\vec{D}_r(k, n)$. In a spatial configuration of a unitary circle centered on the reference listening point O, the virtual sound sources are positioned on the unitary circle. A position of a virtual sound source is therefore at the intersection of the unitary circle with a directional line extending from the reference listening point. The position of each virtual sound source can be defined by a unitary source direction vector $\vec{s}_j(k, n)$ originating from the reference listening point. The unitary source direction vector $\vec{s}_j(k, n)$ is defined through the active directional vector $\vec{D}_a(k, n)$ and reactive directional vector $\vec{D}_r(k, n)$. This is shown in FIG. 6.

As already explained, the active directional vector $\vec{D}_a(k, n)$ indicates the main perceptual sound event direction, the reactive intensity indicates the "direction of maximum perceptual diffuseness". Using three virtual sound sources VS1, VS2, VS3 thus appears relevant to approximate the sound field properties:

one virtual sound source VS1 is in the direction of the active directional vector $\vec{D}_a(k, n)$ to represent the reconstruction of the main acoustic flow, and two virtual sound sources VS2, VS3 negative spatially correlated, in the direction of the reactive directional vector $\vec{D}_r(k, n)$ and its opposite direction, respectively, to represent the acoustic perturbations of the acoustic field.

As a consequence, there are:

a position of a first virtual sound source VS1 defines with the reference listening point O a direction which is collinear to the direction of the active directional vector $\vec{D}_a(k, n)$ from the reference listening point, a position of a second virtual sound source VS2 defines with the reference listening point O a direction which is collinear to the direction of the reactive directional vector $\vec{D}_r(k, n)$ from the reference listening point with a first orientation, a position of a third virtual sound source VS3 defines with the reference listening point a direction which is collinear to the direction of the reactive directional vector $\vec{D}_r(k, n)$ from the reference listening point O with a second orientation opposite to the first orientation.

Indeed, determining the positions of the virtual sound sources VS1, VS2, VS3 is much simpler for the three-source model than for the two-source model, since their source direction vectors $\vec{s}_i(k, n)$ are directly computed from the active directional vector $\vec{D}_a(k, n)$ and the reactive directional vector $\vec{D}_r(k, n)$:

$$\begin{cases} \vec{s}_1(k, n) = \dfrac{\vec{D}_a(k, n)}{\|\vec{D}_a(k, n)\|^2} \\ \vec{s}_2(k, n) = \dfrac{\vec{D}_r(k, n)}{\|\vec{D}_r(k, n)\|^2} \\ \vec{s}_3(k, n) = -\dfrac{\vec{D}_r(k, n)}{\|\vec{D}_r(k, n)\|^2} \end{cases}$$

with a first source direction vector $\vec{s}_1(k, n)$ of a first virtual sound source VS1, a second source direction vector $\vec{s}_2(k, n)$ of a second virtual sound source VS2, and a third source direction vector $\vec{s}_3(k, n)$ of a third virtual sound source VS3. As depicted in FIG. 5, these source direction vectors localize the virtual sound sources VS1, VS2, VS3 on the unitary circle centered on the reference listening point O.

As explained above, after the computation of the directions of the three virtual sound sources VS1, VS2, VS3, it is possible, by combining the sound pressure value P(k, n), the sound velocity vector $\vec{V}(k, n)$ to a source direction vector, to create three virtual directional microphones. As depicted in FIG. 6, the three virtual directional microphones may have a cardioid directivity patterns VM1, VM2, VM3 in the directions of the source direction vectors $\vec{s}_1(k, n)$, $\vec{s}_2(k, n)$, $\vec{s}_3(k, n)$. The virtual microphone pick-ups in these three directions may then be estimated by virtual microphone signals defined as follows:

$$\begin{cases} M_1(k, n) = \dfrac{P(k, n) + \rho c \vec{V}(k, n) \cdot \vec{s}_1(k, n)}{2} \\ M_2(k, n) = \dfrac{P(k, n) + \rho c \vec{V}(k, n) \cdot \vec{s}_2(k, n)}{2} \\ M_3(k, n) = \dfrac{P(k, n) + \rho c \vec{V}(k, n) \cdot \vec{s}_3(k, n)}{2} \end{cases}$$

As explained above, each virtual microphone signal $M_1(k, n)$, $M_2(k, n)$, $M_3(k, n)$ highlights the sound of the corresponding virtual sound source VS1, VS2, VS3 perceived at the reference listening point O, but also contains interferences from the other virtual sound source VS1, VS2, VS3. More precisely, since the second source direction vector $\vec{s}_2(k, n)$ and the third source direction vector $\vec{s}_3(k, n)$ are of opposite direction, interference between the second virtual sound source VS2 and the third virtual sound source VS3 is negligible, whereas they both interfere with the first virtual sound source VS1:

$$\begin{cases} M_1(k, n) = S_1(k, n) + \mu_{12}(k, n) S_2(k, n) + \mu_{13}(k, n) S_3(k, n) \\ M_2(k, n) = S_2(k, n) + \mu_{12}(k, n) S_1(k, n) \\ M_3(k, n) = S_3(k, n) + \mu_{13}(k, n) S_1(k, n) \end{cases}$$

with $$\begin{cases} \mu_{12}(k, n) = \dfrac{1 + \vec{s}_1(k, n) \cdot \vec{s}_2(k, n)}{2} = \dfrac{1 + \dfrac{\vec{D}_a(k, n)}{\|\vec{D}_a(k, n)\|} \cdot \dfrac{\vec{D}_r(k, n)}{\|\vec{D}_r(k, n)\|}}{2} \\ \mu_{13}(k, n) = \dfrac{1 + \vec{s}_1(k, n) \cdot \vec{s}_3(k, n)}{2} = \dfrac{1 - \dfrac{\vec{D}_a(k, n)}{\|\vec{D}_a(k, n)\|} \cdot \dfrac{\vec{D}_r(k, n)}{\|\vec{D}_r(k, n)\|}}{2} \end{cases}$$

A last processing step (step S123) permits to extract the time-frequency signal value of each virtual sound source by unmixing the source time-frequency values:

$$\begin{cases} S_1(k, n) = \dfrac{M_1(k, n) - (\mu_{12}(k, n) M_2(k, n) + \mu_{13}(k, n) M_3(k, n))}{1 - (\mu_{12}(k, n)^2 + \mu_{13}(k, n)^2)} \\ S_2(k, n) = M_2(k, n) - \mu_{12}(k, n) S_1(k, n) \\ S_3(k, n) = M_3(k, n) - \mu_{13}(k, n) S_1(k, n) \end{cases}$$

Contrary to the model with two virtual sound sources, the three virtual sound sources are already decomposed between primary components and ambient components:

the first virtual sound source VS1 corresponds to the primary component, and the second virtual sound source VS2 and third virtual sound source VS3 correspond to the ambient components.

Directional Sound Activity Vector

Once the attributes of the virtual sound sources have been determined (positions and time-frequency signal values), it is possible to determine a directional sound activity vector related to a time-frequency tile from the virtual sound sources. This directional sound activity vector represents the predominant sound direction that would be perceived by a listener according to the recommended loudspeaker layout for sounds within the particular frequency sub-band of the time-frequency tile.

The attributes of the directional sound activity vector is calculated from the positions and time-frequency signal values of the virtual sound sources.

With three virtual sound sources, the energy vectors relative to the sound sources of a time-frequency tile are:

$$\begin{cases} \vec{E}_1(k, n) = |S_1(k, n)|^2 \vec{s}_1(k, n) \\ \vec{E}_2(k, n) = |S_2(k, n)|^2 \vec{s}_2(k, n) \\ \vec{E}_3(k, n) = |S_3(k, n)|^2 \vec{s}_3(k, n) \end{cases}$$

The energy vector sum representative for the perceived directional energy is then:

$$\vec{E}(k,n) = \sum_{j=1}^{3} \vec{E}_J(k,n)$$

The first virtual sound source VS1 is more related to the main perceptual sound event direction and the two other virtual sound sources VS2, VS3 more related to the direction of the maximum perceptual diffuseness. It may be then relevant to take only the first virtual sound source VS1 for the directional sound activity vector. Generally, a weighting of the different virtual sound sources VS1, VS2, VS3 may be used, with a source-weighted directional sound activity vector expressed as:

$$\vec{E}(k,n) = \sum_{j=1}^{3} \omega_j \vec{E}_J(k,n)$$

with $\omega_j$ weighting factors between 0 and 1. Preferably, the sum of the weighting factors $\omega_j$ is 1. Preferably, none of the weighting factors $\omega_j$ is 0. Preferably, the weighting factors $\omega_2$ and $\omega_3$ are equal. Preferably, $\omega_1 > \omega_2$, and $\omega_1 > \omega_3$.

With two virtual sound sources, it is also possible to use a weighted sum of the energy vectors relative to the two sound sources as with the three virtual sound sources. Preferably, the two weighting factors $\omega_1$ and $\omega_2$ are equal.

Frequency Masking

An optional, however advantageous, frequency masking (step S13) can adapt directional sound activity vectors according to their respective frequency sub-bands. In order to tune reactivity with respect to sound frequencies, the norms of the directional sound activity vectors can be weighted based on their respective frequency sub-bands. The weighted directional sound activity vector is then $$\vec{G}[k,n] = \alpha[k] \cdot \vec{E}[k,n]$$

where $\alpha[k]$ is a weight, for instance between 0 and 1, which depends on the frequency sub-band of each directional sound activity vector. Such a weighting allows enhancing particular frequency sub-bands of particular interest for the user. This feature can be used for discriminating sounds based on their frequencies. For instance, frequencies related to particularly interesting sounds can be enhanced in order to distinguish them from ambient noise. The directional sound analyzing unit can be fed with spectral sensitivity parameters which define the weight attributed to each frequency sub-band.

Figure 7:
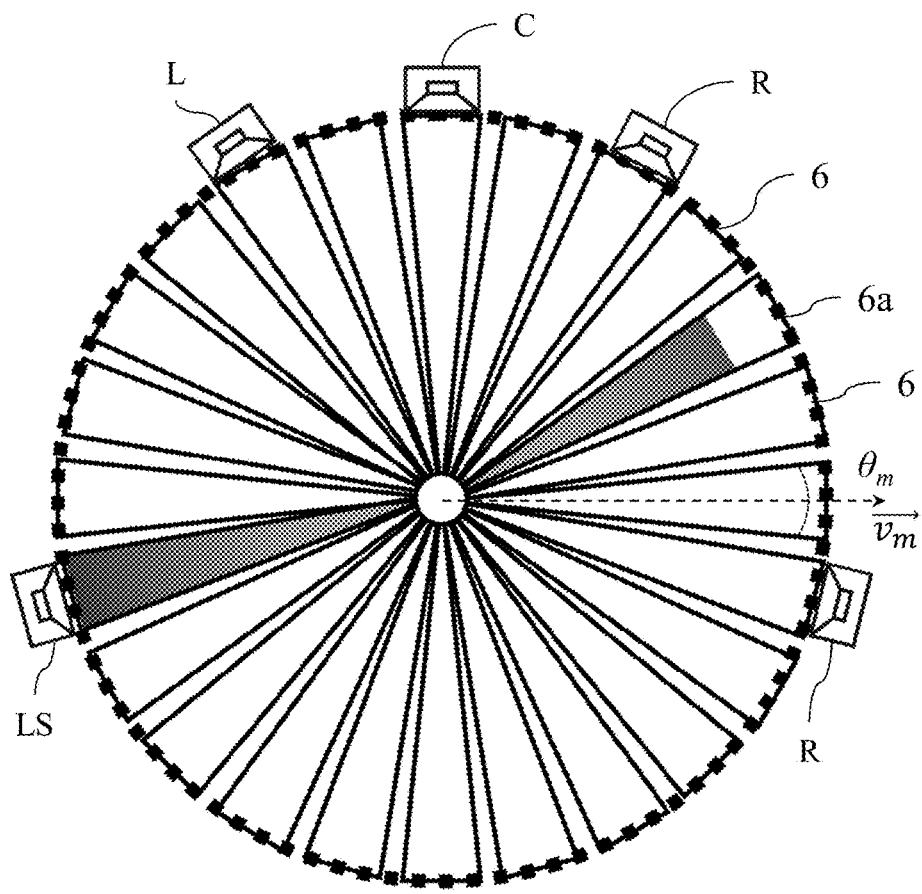
FIG. 7 illustrates a display layout according to an embodiment of the present invention.

In order to directionally visualize sound activity, space is divided into sub-divisions which are intended to discretely represent the acoustic environment of the listener. FIG. 7 shows an example of such a divided space relative to a 5.1 loudspeaker layout. A polar representation of the listener's environment is divided into M similar sub-divisions 6 circularly disposed around the reference listening point in a central position representing the listener's location. Loudspeakers of the recommended layout of FIG. 1 are represented for comparison.

For each frequency sub-band, the dominant sound direction and the sound activity level associated to said direction is now determined and described by the directional sound activity vector, preferably weighted as described above. The visualization of such directional information must be very intuitive so that sound direction information can be restituted to the user without interfering with other source of information.

The beam clustering stage (S14) corresponds to allocating to each of the sub-division a part of each frequency sub-band sound activity.

To this end the contributions of each frequency sub-band sound activity to each sub-division of space are determined on the basis of directivity information. For each sub-division of space, a directional sound activity level is determined within said sub-division of space by combining, for instance by summing, the contributions of said frequency sub-band sound activity to said sub-division of space.

Directivity information is associated to each sub-division 6. Such directivity information relates to level modulation as a function of direction in an oriented coordinate system, typically centered on a listener's position. This directivity information can be described by a directivity function which associates a weight to space directions in an oriented coordinate system. Typically, such a directivity function exhibits a maximum for a direction associated with the related sub-division.

For each sub-division 6 of space, norms of directional sound activity vectors are weighted on the basis of a directivity information associated with said sub-division 6 of space and the directions of said directional sound activity vectors. These weighted norms can thus represent the contribution of said directional sound activity vectors within said sub-divisions of space.

For instance, a directivity function can be parameterized by a beam vector $\vec{v}_m$ and an angular value $\theta_m$ corresponding to the angular width of the beam, wherein m identifies a space sub-division. The direction associated with a sub-division 6 can be the main direction defined by the beam vector $\vec{v}_m$. Accordingly, the angular distance between a beam vector $\vec{v}_m$ and a directional sound activity vector $\vec{G}[k]$ can define the clustering weight $C_m[k]$. For instance, a simple directional weighting function may be 1 if the angular distance between a beam vector $\vec{v}_m$ and a directional sound activity vector $\vec{G}[k]$ is less than $\theta_m/2$ and 0 otherwise:

$$C_m[k] = \begin{cases} 1 & \text{if } \text{angle}(\vec{v}_m, \vec{G}[k]) \leq \theta_m/2 \\ 0 & \text{if } \text{angle}(\vec{v}_m, \vec{G}[k]) > \theta_m/2 \end{cases}$$

The beam vector $\vec{v}_m$ and the angular value $\theta_m$ used for define the parameters of the directivity function can constitute an example of directivity information by which contribution of each one of said directional sound activity vectors within sub-divisions of space can be estimated.

The directional sound activity within a beam or sub-division of space can then be determined by summing said contributions, such as weighted norms in this example, of said directional sound activity vectors related to L frequency sub-bands:

$$A_m = \sum_{k=1}^{L} C_m[k] \|\vec{G}[k]\|$$

Once determined, the directional sound activity for each of the M beam can be fed to a visualizing unit, typically to a screen associated with the computer which comprises or constitutes the directional sound analyzing unit.

For every space sub-division 6, such as the beams illustrated in FIG. 7, directional sound activity can then be displayed for visualization (step S04). A graphical representation of directional sound activity level within said sub-division of space is displayed, as in FIG. 7. In the displayed graphical representation, sub-divisions of space are organized according to their respective location within said space, so as to reconstruct the divided space.

FIG. 7 shows a configuration wherein the directional sound activity is restricted in two different beams, suggesting that sound sources related to different frequencies are located in the directions related to these two beams. It shall be noted that at least one beam 16a shows a directional sound activity without having a direction that corresponds to a loudspeaker recommended orientation. As can be seen, a user can easily and accurately infer sound source directions, and thus can retrieve sound direction information originally conveyed by the multichannel audio input signal.

Other graphical representation can be used, such a radar chart wherein directional sound activity levels are represented on axes starting from the center, lines or curves being drawn between the directional sound activity levels of adjacent axes. Preferably, the lines or curves define a colored geometrical shape containing the center.

The invention thus allows sound direction information to be delivered to the user even if said user does not possess the recommended loudspeaker layout, for example with headphones. It can also be very helpful for hearing-impaired people or for users who must identify sound directions quickly and accurately.

Preferably, the graphical representation shows several directional sound activity levels for each sub-division, these directional sound activity levels being calculated with different frequency masking parameters.

For example, at least two set of spectral sensitivity parameters are chosen to parameterize two frequency masking process respectively used in two directional sound activity level determination processes. The two set of directional sound activity vectors determined from the same input audio channels are weighted based on their respective frequency sub-bands in accordance with two different set of weighting parameters. Consequently, for each sub-division, each one of the two directional sound activity levels enhanced some particular frequencies in order to distinguish different sound types.

The two directional sound activities can then be displayed simultaneously within the same sub-divided space, for example with a color code for distinguishing them and a superimposition, for instance based on level differences.

The method of the present invention as described above can be realized as a program and stored into a non-transitory tangible computer-readable medium, such as CD-ROM, ROM, hard-disk, having computer executable instructions embodied thereon that, when executed by a computer, perform the method according to the invention.

While the present invention has been described with respect to certain preferred embodiments, it will be apparent to those skilled in the art that various changes and modifications may be made without departing from the scope of the invention as defined in the appended claims.

What is claimed is:

1. A method for visualizing a directional sound activity of a multichannel audio signal, wherein the multichannel audio signal comprises time-dependent input audio signals, each time-dependent input audio signal being associated with an input channel, spatial information with respect to a reference listening point being associated with each one of said channel, the method comprising:

receiving the time-dependent input audio signals;

performing a time-frequency conversion of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, the time frame and frequency sub-band of each said time-frequency tile being the same for the different input channels;

for each time-frequency tile, determining positions of at least two virtual sound sources with respect to the reference listening point and frequency signal values for each virtual sound source from an active directional vector and a reactive directional vector determined from time-frequency representations of different input audio signals for said time-frequency tile, wherein the active directional vector is determined from a real part of a complex intensity vector and the reactive directional vector is determined from an imaginary part of the complex intensity vector;

for each time-frequency tile, determining a directional sound activity vector from the virtual sound sources, determining a contribution of each one of said directional sound activity vectors within sub-divisions of space on the basis of directivity information related to each sub-divisions of space, wherein said directivity information relates to level weighting as a function of direction in an oriented coordinate system;

for each sub-division of space, determining directional sound activity level within said sub-division of space by summing said contributions within said sub-division of space;

displaying a visualization of the directional sound activity of the multichannel audio signal by a graphical representation of directional sound activity level within said sub-division of space.

2. The method of claim 1, wherein the active directional vector of a time-frequency tile is representative of the sound energy flow at the reference listening point for the time frame and a frequency sub-band of said time-frequency tile, and wherein the reactive directional vector is representative of acoustic perturbations at the reference listening point with respect to the sound energy flow.

3. The method according to claim 1, wherein each input channel is associated with a sound direction defined between the reference listening point and the prescribed position of the speaker associated with said input channel, and a sound velocity vector is determined as a function of a sum of each sound direction weighted by the time-frequency representation corresponding to the input channel associated with said sound direction, said sound velocity vector being used to determine the active directional vector and the reactive directional vector.

4. The method according to claim 1, wherein a sound pressure value defined by a sum of the time-frequency representations of the different input channels is used to determine the active directional vector and the reactive directional vector.

5. The method according to claim 1 wherein the complex intensity vector results from a complex product between a conjugate of a sound pressure value for a time-frequency tile and a sound velocity vector for said time-frequency tile.

6. The method according to claim 1, wherein for determining time-frequency signal values of each one of the virtual sound sources, virtual microphone signals are determined, each virtual microphone signal being associated with a virtual sound source and corresponding to the signal that would acquire a virtual microphone arranged at the reference listening point and oriented in the direction toward the position of said virtual sound source.

7. The method according to claim 6, wherein the time-frequency signal value of a virtual sound source is determined by suppressing, in the virtual microphone signal associated with said virtual sound source, the interferences from other virtual sound sources.

8. The method according to claim 6, wherein the virtual sound sources are arranged on a circle centered on the reference listening point and a virtual microphone signal corresponds to the signal that would acquire a virtual cardioid microphone having an cardioid directivity pattern in the shape of a cardioid tangential to the circle centered on the reference listening point.

9. The method according to claim 1, wherein there are three virtual sound sources for each time-frequency tile, each virtual sound source having a position with respect to the reference listening point, wherein:
a position of a first virtual sound source defines with the reference listening point a direction which is collinear to the direction of the active directional vector from the reference listening point,
a position of a second virtual sound source defines with the reference listening point a direction which is collinear to the direction of the reactive directional vector with a first orientation,
a position of a third virtual sound source defines with the reference listening point a direction which is collinear to the direction of the reactive directional vector with a second orientation opposite to the first orientation.

10. The method according to claim 1, wherein there are two virtual sound sources for each time-frequency tile, each virtual sound source having a position with respect to the reference listening point, and wherein:
a position of a first virtual sound source defines with the reference listening point a direction resulting from the sum of the active directional vector and the reactive directional vector weighted by a positive factor, and
a position of a second virtual sound source defines with the reference listening point a direction resulting from the sum of the active directional vector and the reactive directional vector weighted by a negative factor.

11. The method of claim 1, wherein directional information used for determining the contribution of a directional sound activity vector within a sub-division of space is an angular distance between a direction associated with said sub-division of space and the direction of said directional sound activity vector.

12. The method according to claim 1, wherein the contribution of a directional sound activity vector within a sub-division of space is determined by weighting a norm of said directional sound activity vector on the basis of an angular distance between a direction associated with said sub-division of space and the direction of said directional sound activity vector.

13. The method of claim 1, wherein norms of the directional sound activity vectors are further weighted based on their respective frequency sub-bands.

14. The method of claim 13, wherein at least two set of directional sound activity vectors determined from the same input audio channels are weighted based on their respective frequency sub-bands in accordance with two different set of weighting parameters, and the two resulting directional sound activities are displayed on the graphical representation.

15. The method of claim 1, wherein the visualization of the directional sound activity of the multichannel audio signal comprises representations of said sub-division of space, each provided with a representation of the directional sound activity associated with said sub-division.

16. A non-transitory tangible computer-readable medium having computer executable instructions embodied thereon that, when executed by a computer, perform the method of claim 1.

17. An apparatus for visualizing directional sound activity of a multichannel audio signal, comprising:
an input for receiving time-dependent input audio signals for a plurality of input channels,
a processor and a memory for:
performing a time-frequency conversion of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, the time frame and frequency sub-band of each said time-frequency tile being the same for the different input channels,
for each time-frequency tile, determining an active directional vector and a reactive directional vector from time-frequency representations of different input channels for said time-frequency tile, wherein the active directional vector is determined from a real part of a complex intensity vector and the reactive directional vector is determined from an imaginary part of the complex intensity vector,
for each time-frequency tile, determining positions of at least two virtual sound sources with respect to the reference listening point in a virtual spatial configuration from the active directional vector and the reactive directional vector, and determining time-frequency signal values for each virtual sound sources,
for each time-frequency tile, determining a directional sound activity vector from the virtual sound sources,
determining a contribution of each one of said directional sound activity vectors within sub-divisions of space on the basis of directivity information related to each sub-divisions of space, wherein said directivity information relates to level weighting as a function of direction in an oriented coordinate system;
for each sub-division of space, determining directional sound activity data within said sub-division of space by summing said contributions within said sub-division of space,
a visualizing unit for displaying a visualization of the directional sound activity of the multichannel audio signal.

* * * * *